US009442178B2

(12) United States Patent
Eruchimovitch et al.

(10) Patent No.: US 9,442,178 B2
(45) Date of Patent: Sep. 13, 2016

(54) HYBRID TRACKING DEVICE

(75) Inventors: Baruch Eruchimovitch, Haifa (IL);
Gilad Bornstein, Haifa (IL); Nir Strauss, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 764 days.

(21) Appl. No.: 12/766,727

(22) Filed: Apr. 23, 2010

(65) Prior Publication Data

US 2011/0260858 A1 Oct. 27, 2011

(51) Int. Cl.
| | |
|---|---|
| *G01S 5/02* | (2010.01) |
| *G01S 5/00* | (2006.01) |
| *G01S 19/48* | (2010.01) |
| *G06Q 10/08* | (2012.01) |
| *G08B 25/01* | (2006.01) |
| *G08B 29/02* | (2006.01) |

(52) U.S. Cl.
CPC ............... *G01S 5/02* (2013.01); *G01S 5/0027* (2013.01); *G01S 19/48* (2013.01); *G06Q 10/08* (2013.01); *G06Q 10/083* (2013.01); *G08B 25/01* (2013.01); *G08B 29/02* (2013.01)

(58) Field of Classification Search
CPC ............... G06Q 10/08; G06Q 10/083; G06Q 10/0833; G08B 25/01; G08B 29/02; G08B 29/04; G08B 29/16; H04W 88/04
USPC .................. 340/539.13, 539.1, 572.1, 572.4; 455/456.1

See application file for complete search history.

(56) References Cited

U.S. PATENT DOCUMENTS

| | | | | |
|---|---|---|---|---|
| 8,326,958 | B1* | 12/2012 | Raleigh ..................... | 709/223 |
| 2002/0119770 | A1 | 8/2002 | Twitchell et al. | |
| 2003/0063585 | A1* | 4/2003 | Younis ................... | G01D 9/005 370/331 |
| 2003/0137968 | A1 | 7/2003 | Lareau et al. | |
| 2004/0041706 | A1 | 3/2004 | Stratmoen et al. | |
| 2004/0174259 | A1 | 9/2004 | Peel et al. | |
| 2005/0052290 | A1 | 3/2005 | Naden et al. | |
| 2006/0181413 | A1* | 8/2006 | Mostov ................... | 340/539.22 |
| 2007/0188322 | A1 | 8/2007 | English et al. | |
| 2008/0019344 | A1* | 1/2008 | Palm et al. .................. | 370/338 |
| 2008/0056191 | A1 | 3/2008 | Heinonen et al. | |

(Continued)

FOREIGN PATENT DOCUMENTS

| | | |
|---|---|---|
| CN | 101361321 A | 2/2009 |
| EP | 0748085 A1 | 12/1996 |

(Continued)

OTHER PUBLICATIONS

International Search Report and Written Opinion—PCT/US2011/033646, ISA/EPO—Jul. 22, 2011.

*Primary Examiner* — Hongmin Fan
(74) *Attorney, Agent, or Firm* — Bala Ramasamy (57) ABSTRACT

Apparatus and methods for tracking various assets. The apparatus includes a hybrid tracking device (HTD) for tracking an associated asset. The HTD includes a personal area network (PAN) transceiver to couple the HTD to a gateway, proxy or slave HTDs. The HTD may include a sensor to generate sensor information. Alternatively, the sensor information is generated remotely. The sensor information includes a determined location and/or information characteristic of an HTD or its environment. Sensor information from one sensor is used to represent HTDs separated by the PAN. The HTD may also include a wide area network (WAN) transceiver to communicate with an asset tracking server.

45 Claims, 7 Drawing Sheets

(56) References Cited

U.S. PATENT DOCUMENTS

| | | |
|---|---|---|
| 2008/0061963 A1 | 3/2008 | Schnitz et al. |
| 2009/0040039 A1* | 2/2009 | Kaneko et al. ............ 340/539.3 |
| 2009/0189788 A1 | 7/2009 | Faus et al. |
| 2010/0090822 A1* | 4/2010 | Benson et al. ................ 340/508 |
| 2011/0018707 A1* | 1/2011 | Dobson et al. .......... 340/539.13 |
| 2011/0148625 A1* | 6/2011 | Velusamy ................ 340/539.13 |
| 2012/0206243 A1* | 8/2012 | Butler et al. ................ 340/10.51 |

FOREIGN PATENT DOCUMENTS

| | | |
|---|---|---|
| EP | 1528706 A1 | 5/2005 |
| EP | 1895456 A1 | 3/2008 |
| JP | H09171571 A | 6/1997 |
| JP | 2004343448 A | 12/2004 |
| JP | 2009524345 A | 6/2009 |
| JP | 2010056678 A | 3/2010 |
| JP | 2010088095 A | 4/2010 |
| JP | 2012500573 A | 1/2012 |
| KR | 20070085543 A | 8/2007 |
| KR | 20090058732 A | 6/2009 |
| KR | 20090133058 A | 12/2009 |
| WO | WO-2008048287 A2 | 4/2008 |
| WO | WO-2010021853 A2 | 2/2010 |

* cited by examiner

HYBRID TRACKING DEVICE

CROSS-REFERENCE TO RELATED APPLICATIONS

Not applicable.

BACKGROUND OF THE INVENTION

1. Field of the Invention

This disclosure generally relates to wireless location-based services, and more particularly to hybrid tracking devices using a personal area network to tracking assets and communicate with an asset tracking server.

2. Background of the Invention

Location-based services and tracking of various goods or other assets have become useful and necessary in our modern mobile and information focused society. Particularly, it has become useful to track the locations of assets as they are moved through the stream of commerce. For example, in U.S. Publ. 2009/0189788 (titled "System and method for sensing cargo loads and trailer movement" to Faus and published Jul. 30, 2009, which is incorporated by reference herein) describes a system for sensing cargo loads and trailer movement uses one or more sensors to provide information about trailer loading activity and trailer movement. These tracking devices may be used as part of a location-based service to track and/or monitor assets. Currently, however, tracking devices include a wide area network (WAN) transceiver to communicate with a remote asset tracking server and also include a location sensor (such as a GPS receiver). Such WAN transceiver and location sensors use significant amounts of power when determining and reporting a location of the device and sensor data.

The present disclosure provides aspects of improved apparatus and methods of location-based services to track and/or monitor various assets or subjects of interest.

SUMMARY OF THE DISCLOSURE

Disclosed is an apparatus and methods for a hybrid tracking devices associated with assets to be tracked.

According to some aspects, disclosed is a hybrid tracking device for tracking various associated assets. The device includes a sensor to generate information of a characteristic of the device. The sensor information may be location information of the device. The location information may be a global position satellite (GPS) position or an assisted global position satellite (A-GPS) position. The device may also include a WAN transceiver to couple the device to an asset tracking server. The device may also include a personal area network (PAN) transceiver to couple the device to a second hybrid tracking device. The WAN transceiver sends sensor information to the asset tracking device as the characteristic of the hybrid tracking device (HTD) and the second HTD.

According to other aspects, disclosed is a hybrid tracking device for tracking various associated assets. The device includes a sensor to generate information of a characteristic of the device. The sensor information may be location information of the device. The location information may be a global position satellite (GPS) position or an assisted global position satellite (A-GPS) position. Alternatively or in addition, sensor information may be information for any one or more of a number of sensors. The device may also include a WAN transceiver to couple the device to an asset tracking server. The device may also include a PAN transceiver to couple the device to a second hybrid tracking device. The device may also include a controller to control the device to operate in a first mode or a second mode. When the device operates in the first mode, the controller activates the sensor, the PAN transceiver communicates with the second device, wherein the second device may be operating in the second mode, and the WAN transceiver sends the sensor information to the asset tracking server as the characteristic of the device and the second device. When the device operates in the second mode, the controller de-activates the sensor, the controller de-activates the WAN transceiver, and the device communicates the asset tracking server through the second device operating in the first mode.

According to other aspects, disclosed is a location-based services system. The system includes an asset tracking server coupled to a WAN and a hybrid tracking device (HTD) operating in a master mode and a second hybrid tracking device (HTD) operating in a slave mode, the HTD operating in the master mode is associated with an asset to track. The HTD in the master mode includes a sensor to generate sensor information of a characteristic of the HTD, wherein the sensor information comprises location information of the HTD and/or other sensor information. The HTD also includes a WAN transceiver to couple the HTD to the asset tracking server. The HTD further includes a PAN transceiver to couple the HTD to the second HTD operating in the slave mode.

According to other aspects, disclosed is a location-based services system. The system includes an asset tracking server coupled to a WAN and a plurality of hybrid tracking device (HTD), each one of the HTD is associated with an asset to track. Each one of the HTDs includes a sensor to generate sensor information of a characteristic of the HTD, wherein the sensor information comprises location information of the HTD and/or other sensor information. The HTD also includes a WAN transceiver to couple the HTD to the asset tracking server. The HTD further includes a PAN transceiver to couple the HTD to a second HTD. The HTD further includes a controller, the controller controls the HTD to operate in a first mode or a second mode. In the first mode, the controller activates the sensor, the PAN transceiver communicates with the second HTD, wherein the second HTD operates in the second mode, and the WAN transceiver sends the sensor information to the asset tracking server as the characteristic of the HTD and the second HTD. In the second mode, the controller de-activates the sensor, the controller de-activates the WAN transceiver, and the HTD communicates with the asset tracking server through the second HTD operating in the first mode.

According to other aspects, disclosed is a location-based services system. The system includes a proxy, and the proxy includes a sensor to generate sensor information of a characteristic of the proxy. The sensor information includes location information of the proxy and/or other sensor information. The proxy also includes a WAN transceiver to couple the proxy to an asset tracking server. The proxy further includes a PAN transceiver to couple the proxy to a plurality of hybrid tracking devices (HTDs), each of the HTDs is associated with an asset to track. Each of the HTDs communicates with the asset tracking server through the proxy, and the HTDs activate the transmission of sensor information of the characteristic of the proxy to the asset tracking server as a characteristic of the plurality of HTDs.

According to other aspects, disclosed is a location-based services system. The system includes an asset tracking server coupled to a WAN and a plurality of hybrid tracking devices (HTDs), each of the HTDs is associated with an asset to track. The system further includes a proxy and the proxy includes a sensor to generate sensor information of a characteristic of the proxy. The sensor information includes location information of the proxy and/or other sensor information. The proxy also includes a WAN transceiver to couple the proxy to an asset tracking server. The proxy further includes a PAN transceiver to couple the proxy to a plurality of hybrid tracking devices (HTDs), each of the HTDs is associated with an asset to track. Each of the HTDs communicates with the asset tracking server through the proxy, and the HTDs activate the transmission of sensor information of the characteristic of the proxy to the asset tracking server as a characteristic of the plurality of HTDs.

According to other aspects, disclosed is a method of location-based services for tracking a hybrid tracking device (HTD) associated with an asset. The method includes an HTD searching for a PAN. The PAN being provided or defined by a proxy and a second HTD. The HTD operating in a first mode when the PAN is not available. The operation of the first mode includes generating, from a sensor, sensor information of a characteristic of the HTD. The sensor information may include location information of the HTD and/or other sensor information. The operation of the first mode also include sending the sensor information over a WAN, using a WAN transceiver, to an asset tracking server. The HTD operates in a second mode when the PAN is available. The operation of the second mode includes deactivating the WAN transceiver, and generating, from a sensor, sensor information of a characteristic of the HTD. The sensor information comprises location information of the HTD and/or other sensor information. The operation of the second mode also includes communicating with the asset tracking server over the PAN. Communication with the PAN might include transmitting location information of the HTD.

According to other aspects, disclosed is a method of location-based services for tracking a hybrid tracking device (HTD) associated with an asset to track. The method includes communication between a proxy and the HTD. The method also includes generating, from a sensor, sensor information of a characteristic of the proxy. The sensor information includes location information of the proxy and/or other sensor information. The method further includes sending, over a WAN to an asset tracking server, the sensor information as characteristic of the HTD.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As in the case of a shipped asset (such as a good or package) being delivered from a supplier to a retailer, it would be desirable to track the location of the assets as they are in transit and as they arrive at their destinations. In addition, it would be desirable to monitor the condition of the assets while they are en route to ensure the assets arrive at their destinations in good condition. It would also be useful to track the locations and monitor the conditions of various assets in a building, e.g., goods in a storage warehouse. In some situations, it would be useful to track and monitor the locations of various personal devices within a building or between destinations. In some other situations, it may be useful to monitor the whereabouts of certain family members inside or outside of a home. As used herein, assets include movable goods, products, cargo, packages, personal devices (e.g., laptop computers, mobile phones, personal digital assistances (PDAs), various remote control devices, etc.), moveable equipment (e.g., farm equipment, hospital equipment, laboratory equipment) as well as individual people (e.g., children and teenagers) and animals (e.g., household pets). Hybrid tracking devices described below are used to track such assets.

Figure 1:
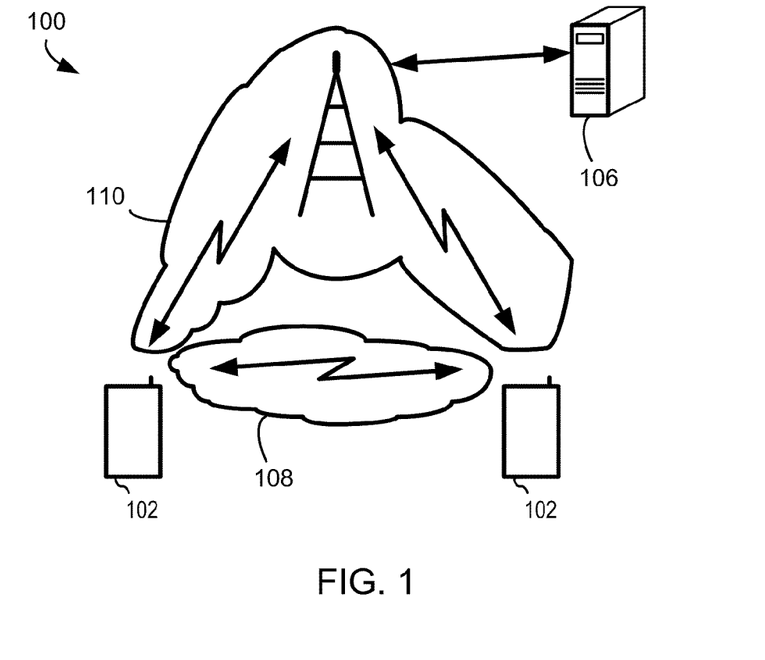
FIG. 1 illustrates a location-based services system for tracking assets, in accordance with some embodiments of the present invention.

FIG. 1 illustrates a location-based services system for tracking assets, in accordance with some embodiments of the present invention. The location-based services system 100 includes one or more hybrid tracking devices (HTDs 102), a personal area network (PAN 108), a wide area network (WAN 110) and an asset tracking server 106. The HTDs 102 track various associated assets (not shown). The asset tracking server 106 receives, processes, transmits or distributes various signals or information provided by the HTDs 102 over the WAN 110 and PAN 108.

An HTD 102 may be associated with an assets, such as a package, being moved, transported or delivered from a place of origination to a place of destination or simply being monitored. Tracking the movement and arrival of such assets may be important for both the senders and receivers of the asset. The asset may also be an individual or animal to be tracked as they play or perform various activities inside or outside of a home. An asset may also be a personal device or moveable equipment. The HTD 102 is used to monitor where such assets are located within a building, container, home or other boundary or structure.

Figure 2:
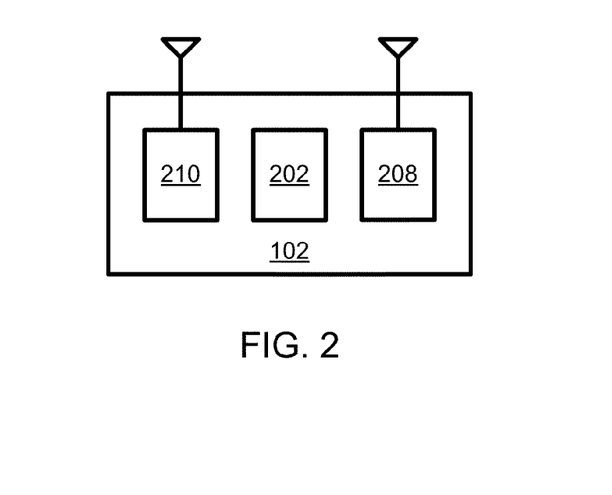
FIG. 2 illustrates an HTD in a location-based services system, in accordance with some embodiments of the present invention.

FIG. 2 illustrates an HTD 102 in a location-based services system, in accordance with some embodiments of the present invention. In typical situations, the HTD 102 and the associated assets to be tracked are placed in close proximity to one another. Additionally, HTDs 102 are also within close proximity to one another such that a short-range communication technology may be used to communicate between various HTDs 102. Each HTD 102 includes a PAN transceiver 208, which uses a low power technology to reduce overall resource requirements. A PAN transceiver 208 uses an implementation of a PAN standard that has a short transmission range and transmits at low power levels. The PAN transceiver 208 communicates over the PAN 108 to a nearby PAN transceiver 208. The PAN 108 uses a low power communication technology, protocol or standard such as Bluetooth, ZigBee, radio-frequency identification (RFID) and the like. Additionally, the PAN 108 may be a point-to-point WLAN technology utilizing a low-power mode. Alternatively, the PAN 108 may be a WAN technology utilizing a low-power mode. As such, the PAN 108 still provides short-range communication at lower power levels than used in the WAN 110.

In some embodiments, the HTD 102 also includes a long-range WAN transceiver 210 to communicate over the WAN 110. The WAN 110 is a long distance data-capable technology, protocol or standard such as provided by a cellular radio network, WiMAX, or the like. The WAN 110 provides a link between an HTD 102 and an asset tracking server 106. Typically, WAN technologies require more power than do PAN technologies. In some embodiments, the HTD 102 has a single transceiver that operates in a low-power mode to provide a PAN transceiver 208 and operates in a high-power mode to provide a WAN transceiver 210.

The HTD 102 may be configured with a sensor 202 to generate sensor information that provides sensor information about a characteristics of the HTD 102 or the associated asset that is being tracked. The sensor 202 may include a location sensor. For example, the sensor 202 may include a satellite positioning system (SPS) receiver for receiving SPS signals and determining a location of the HTD 102 and the associated asset. In some cases, the SPS receiver is a global position satellite (GPS) receiver for receiving signals from a GPS system. The GPS system is a satellite navigation system, or satellite positioning system, designed to provide position, velocity and time information almost anywhere in the world. GPS was developed by the Unites States Department of Defense, and currently includes a constellation of twenty-four operational satellites. Other types of satellite navigation systems include the Wide Area Augmentation System (WAAS), the Global Navigation Satellite System (GLONASS) deployed by the Russian Federation, and the Galileo system planned by the European Union. As used herein, satellite positioning system (SPS) will be understood to refer to GPS, Galileo, GLONASS, NAVSTAR, GNSS, a system that uses satellites from a combination of these systems, pseudolite systems, or any SPS developed in the future.

Alternatively, the sensor 202 may include a sensor to determine a location without SPS technology. For example, the sensor 202 may include a cell identifier (cell ID) recognition unit to retrieve a base station identifier (or the like) from a cellular radio overhead signal. Alternatively, the sensor 202 may determine a location based on more than one system. For example, an assisted GPS (A-GPS) uses information obtained from a cellular network to assist in determining a location based on GPS signal.

The sensor 202 may include one or more sensors to perform various environmental monitoring tasks. For example, the sensor 202 may include a temperature sensor for sensing or monitoring surrounding ambient temperature near the HTDs 102 or the associated assets to be tracked. The sensor 202 may include a motion sensor for sensing motion, movement, or vibration. The sensor 202 may include a light sensor to sense or monitor light, brightness or level of illumination at the HTD 102. The sensor 202 may include a humidity sensor to sense or monitor the level of humidity at the HTD 102. The sensor 202 may include a pressure sensor to sense the nearby ambient pressure. In some situations, assets may be delivered in a pressure controlled container such that the ambient pressure at or around the area near the HTD 102 may be substantially different from the ambient pressure outside of the container. The sensor 202 may include a sound sensor to sense or monitor sound or noise levels at the HTD 102. The sensor 202 may include an air movement sensor to sense or monitor air movement at the HTD 102. In some situations, for example, certain amount of air ventilation may be required to maintain the associated assets in good condition, as such air movement at the HTD 102 may be monitored. The sensor 202 may include an air sampling sensor to sense or sample air molecules for chemicals. The sensor 202 may include an altimeter sensor to record a level above sea level. The sensor 202 may include an accelerometer, such as a one-, two- or three-dimensional MEMS device, to measure linear and/or angular acceleration. The sensor 202 may include an orientation sensor, such as a solid state compass, to measure a magnetic direction relative to the sensor. The sensor 202 may include a radiation sensor, such as an Geiger counter or a solid state nuclear radiation sensor, to measure a radiation level near the sensor.

In some situations, assets are transported or stored in a storage unit or chamber. In these cases, a sensor 202 may be used to sense or monitor the condition of the transported or stored assets in the storage unit or chamber. In one example, the asset is perishable goods or specialty food items (e.g., a vintage cheese or wine) that are being transported or aged in a storage unit or chamber. As such, among other conditions (e.g., temperature, light, air movement, humidity, etc.) may be monitored, the presence or absence of certain chemicals in the ambient air may be monitored to ensure that the perishable goods or specialty food items is kept and aged within proper tolerances.

The sensor 202 may include any other suitable of sensor for sensing characteristic information at or near the HTD 102. Therefore, a sensor 202 provides sensor information including a location and/or other characteristic information including any one or more of temperature, motion, light, humidity, pressure, sound, air movement, air sample, altitude, and the like. As may be appreciated, sensor 202 may be a single sensor or a combination of sensors, such as a sensor module or sensor array that may include a plurality of sensors to sense various characteristic information at or near the HTD 102 or associated asset.

An HTD 102 may be powered by an attached battery power supply. Alternatively, an HTD 102 may be powered by an external power source. For example, an HTD 102 may be powered by an auxiliary power unit (APU) or battery of a delivery truck, or it might be connected to a power outlet of a storage container or storage room. Typically, an HTD 102 operating a WAN transceiver 210 is connected to an external power source. Furthermore, an HTD 102 operating a sensor 202 is also connected to an external power source.

Configuring an HTD 102 with low power consumption components may reduce or eliminate the need for frequent battery replacements, battery recharges or concern for excessive power loading to the external power supply. In addition, for location-based services and tracking, the rate of signal or data transmission requirements may be substantially low; as such, less expensive low bandwidth PAN 108 and PAN transceivers 208 may be selected and implemented, as described above.

In some aspects, one of the HTDs 102 communicates using a WAN transceiver 210, while the other HTDs 102 have no WAN transceiver or have their WAN transceiver 210 in a disabled state. One or a limited number of the HTDs 102 (the same HTD 102 operating its WAN transceiver 210 or a different HTD 102) may operate its sensor 202, while other HTDs 102 either have no sensors or have their sensor 202 in a disabled state. In such a situation, sensor information from one sensor 202 is used to characterize all HTDs 102 in the PAN 108. This sensor information is communicated by the one HTD 102 using its WAN transceiver 210. Other HTDs 102 communicate over the PAN to the one HTD 102 connected to the WAN 110.

Figure 3:
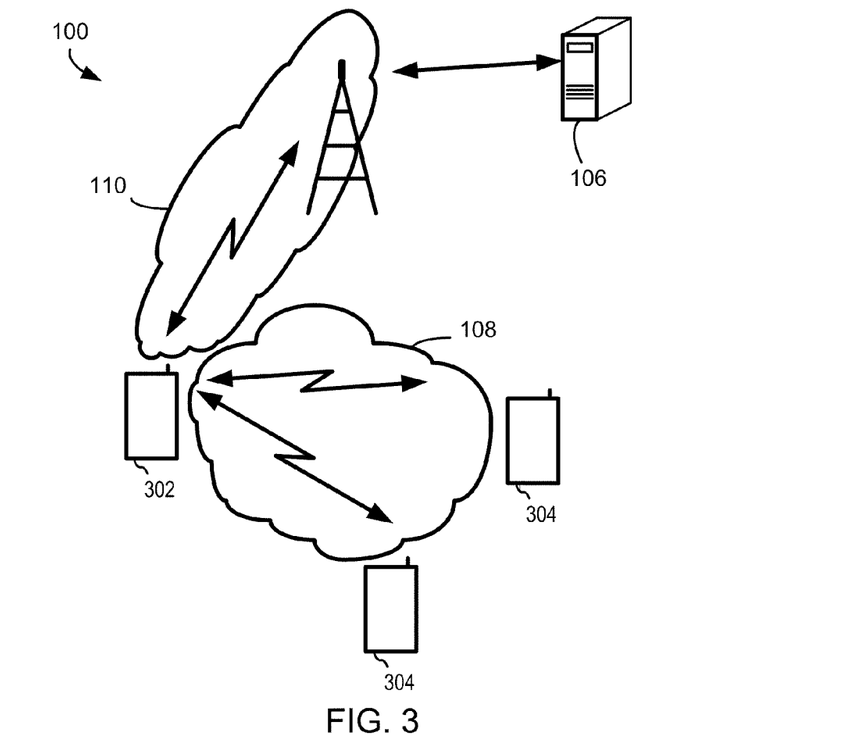
FIG. 3 illustrates a location-based services system for tracking assets, in accordance with some embodiments of the present invention.

FIG. 3 illustrates a location-based services system for tracking assets, in accordance with some embodiments of the present invention. The location-based services system 100 includes an asset tracking server 106 and multiple HTDs 102. The HTDs 102 include one gateway HTD 302. The remaining HTDs 102 are slave HTDs 304. The gateway HTD 302 communicates with the asset tracking server 106 over a WAN 110 and also communicates with the one or more slave HTDs 304 over a PAN 108. The gateway HTD 302 and slave HTDs 304 each track various associated assets (not shown). Each of the HTDs 102 (gateway HTD 302 and slave HTDs 304) may be identical but operating in different modes. The operational mode may be determined by the asset tracking server 106 or by an HTDs 102 individually or collectively.

For example, the asset tracking server 106 may determine which one HTD 102 will act as a gateway HTD 302. Alternatively, an HTD 102 may be preconfigured to act as a gateway HTD 302. Alternatively, the HTDs 102 may negotiate over the PAN as to which one HTD 102 will become the gateway HTD 302, for example, based on power reserves. Priority may be given to an HTD 102 connected to an external power supply over an HTD 102 powered by an attached battery pack or an HTD 102 with a lower level of power available in its battery pack. In this way an HTD 102 having the sufficient power is selected as the gateway HTD 302. It would be desirable to select an HTD 102 that has sufficient or consistent level of power available to operate and transmit sensor information over the more power-consuming long-range WAN 110. Also, it would be desirable to conserve or reduce the power consumption of the HTDs 102 that are operating on battery supplied power. Accordingly, the slave HTDs 304 may communicate or transmit sensor information to the gateway HTD 302 over the short-range PAN 108, which typically requires low power consumption for operation. The gateway HTD 302, which may be connected to an external power supply or has a fully charged battery pack, transmits the sensor information as characteristic information to the asset tracking server 106 over the more power consuming WAN 110.

In this example, the gateway HTD 302 may operate as a master in a master operational mode. Sensor information from the gateway HTD 302 may be used to represent information from the slave HTDs 304 located within the PAN 108. In other words, the sensor information generated by the sensor 202 of the gateway HTD 302 may be used to represent, replace or characterize information from the slave HTDs 304. For example, the sensor 202 at the gateway HTD 302 may determine the location and sense the atmospheric pressure at the gateway HTD 302. The gateway HTD 302 then characterizes each of the slave HTDs 304 as having the same determined location and sensed pressure as the gateway HTD 302. Therefore, characteristic information, such as location and/or other sensed information, is used to represents those characteristics at each of the slave HTDs 304.

The slave HTDs 304 may be configured as slaves or operate in a slave operational mode. In some embodiments, the slave HTDs 304 do not have sensors or power down one or more or all of their sensors. In another aspect, the sensor information from a slave HTDs 304 may be transmitted to the asset tracking server 106 over the PAN 108 via the gateway HTD 302. That is, the sensor information from a slave HTD 304 may be transmitted to the gateway HTD 302 over the PAN 108. The sensor information from the slave HTDs 304 may then be transmitted to the asset tracking server 106 by the gateway HTD 302 over the WAN 110 as characteristic information of the slave HTD 304 and all other HTDs 102 in the PAN 108. In another aspect, the gateway HTD 302 assigns sensor information from one HTD 102 to other HTDs 102. In this manner, the one HTD 102 (e.g., gateway HTD 302) operates to senses data representative of all of the HTDs 102. The other HTDs 102 may then power down or disable their sensors 202.

Overall system resources may be reduced or minimized by having one HTD 102 act as a gateway HTD 302 and communicate with the asset tracking server 106 through the WAN 110, instead of having all the HTDs 102 communicate directly over the WAN 110. In other words, overall system resources may be reduced or minimized by selecting one HTD 102 as a gateway HTD 302 while other HTDs 102 operate as slave HTDs 304 and communicate only over the PAN 108. Communication by a slave HTD 304 with the asset tracking server 106 is executed through the gateway HTD 302. Accordingly, the gateway HTD 302 may operate as a relay for transmitting information between the slave HTDs 304 and the asset tracking server 106.

Similarly, overall system resources may be reduced or minimized by having only one HTD 102 with an operating sensor 202 and having the other HTDs 102 disable their sensors 202. Overall power is substantially lower than having all the HTDs 102 operating their own sensor 202. Sensor information from one HTD 102 may be used by the gateway HTD 302 to represent sensor information from all of the HTDs 102. For example, one HTD 102, such as the gateway HTD 302, may determine its location using a GPS receiver. The gateway HTD 302 will receive this location data and use it when communicating the location of any HTD 102 to the asset tracking server 106. Though, the sensed information (e.g., location or pressure) may be slightly different among the HTDs 102, the difference may be insignificant and the battery savings for all of the other HTDs 102 in the aggregate may be substantial. In some cases, only the sensor 202 on the gateway HTD 302 is used. In other cases, a sensor 202 in a slave HTD 304 is used. In these cases, the sensor information may be transmitted from the slave HTD 304 to the gateway HTD 302 by way of the PAN 108. The sensor information is then transmitted as information representative of all HTDs 102 from the gateway HTD 302 to the asset tracking server 106 by way of the WAN 110.

In a PAN 108, the slave HTDs 304 may register with the gateway HTD 302. The gateway HTD 302 may record an identifier of each registered slave HTDs 304 and may maintain an inventory of registered slave HTDs 304 currently in the PAN 108.

The sensor information transmitted from the gateway HTD 302 may be sensor information representative of the gateway HTD 302 and/or a slave HTD 304. That is, the sensor information transmitted from the gateway HTD 302 may be sensor information sensed by the sensor of the gateway HTD 302 and processed by the asset tracking server 106 as sensor information representative of all the HTDs 102. In another aspect, the sensor information is aggregated sensor information from one, two or more, or all the sensors of the HTDs 102. In this aspect, each of the HTDs 102 providing sensor information would be configured with a sensor 202 to sensors characteristic information.

Figure 4:
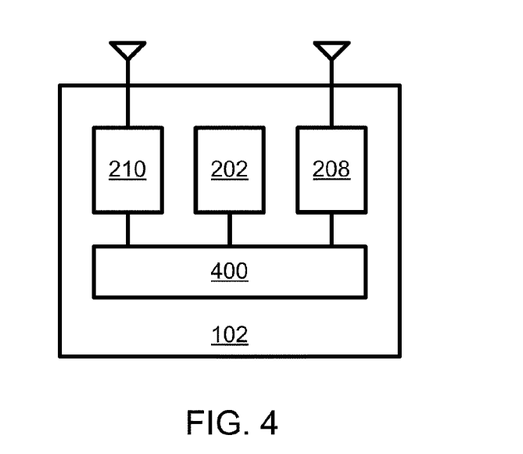
FIG. 4 illustrates another embodiment of a hybrid tracking device of a location-based services system, in accordance with some embodiments of the present invention.

FIG. 4 illustrates another embodiment of a hybrid tracking device of a location-based services system, in accordance with some embodiments of the present invention. Each HTD 102 may be include a controller 400 for selecting an operational mode of the HTD 102. For example, the controller 400 of the HTD 102 may select to operate in a first mode (a gateway or master mode as discussed above) or in a second mode (a slave mode as discussed above). In this aspect, the controller 400 selects the operational mode of the HTD 102. An HTD 102 operating in a first mode or master mode would transmit sensor information to the asset tracking server 106. Furthermore, this sensor information from one HTD 102 may be used as information representative of the all of the HTDs 102 in the PAN 108. In some embodiments, the sensor information is generated by a sensor 202 in the gateway HTD 302. In other embodiments, the sensor information is generated by a sensor 202 in a slave HTD 304. In some embodiments, the sensor information is compiled from sensors 202 of multiple HTDs 102.

Figure 5A:
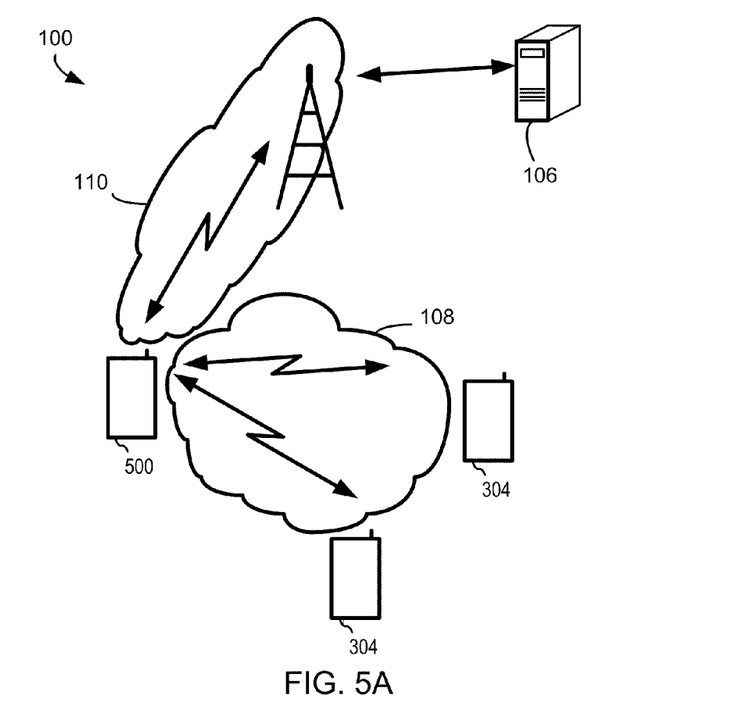
FIGS. 5A and 5B illustrate a proxy in a location-based services system, in accordance with some embodiments of the present invention.
Figure 5B:
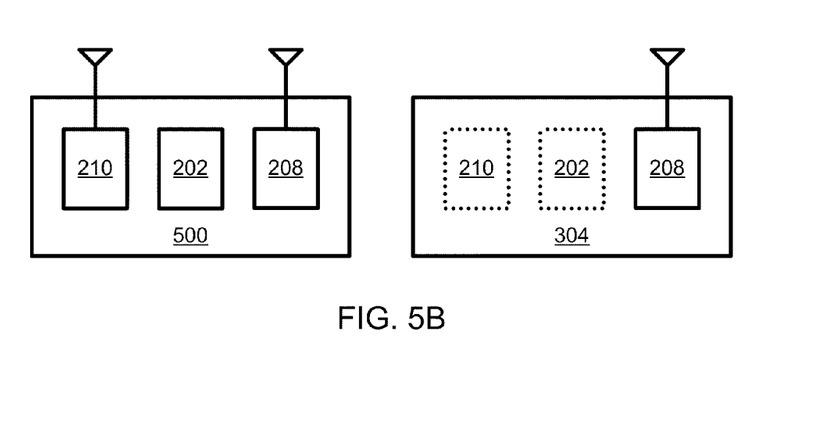

FIGS. 5A and 5B illustrate a proxy in a location-based services system, in accordance with some embodiments of the present invention. In FIG. 5A, the location-based services system 100 includes an HTD proxy (HTDP 500) instead of a gateway HTD 302. The location-based services system 100 also includes one or more slave HTDs 304 that communicate over a PAN 108. The location-based services system 100 also includes an asset tracking server 106 that communicate with the HTDP 500 over a WAN 110. Unlike a gateway HTD 302, however, the HTDP 500 is not associated with an asset to track. Instead, the HTDP 500 may be associated with a structure (e.g., a vehicle or a building) in which slave HTDs 304 and associated assets may reside.

As illustrated in FIG. 5B, the HTDP 500 includes a WAN transceiver 210, a sensor 202 and a PAN transceiver 208, each described above. The HTDP 500 may use its sensor 202 to generate sensor information associated with the HTDP 500. The sensor 202 may include any one, two or more of the sensor information (e.g., location or pressure) described above with respect to the HTDs 102, 302 and 304. Again, the sensor information transmitted from the HTDP 500 is characteristic information of representative of the slave HTDs 304. That is, the sensor 202 of an HTDP 500 may be used to determine a location and/or additional characteristic information the HTDP 500 may associate with each slave HTD 304 within the PAN 108.

The PAN transceiver 208 in an HTDP 500 may be used to determine the presence of a slave HTD 304. For example, the PAN transceiver 208 in the HTDP 500 may ping, page or instruct each slave HTD 340 to register with the HTDP 500. Alternatively, the slave HTDs 304 may autonomously register their presence with the HTDP 500 through the PAN 108 using their respective PAN transceivers 208. The HTDP 500 records the registered slave HTDs 304 and maintains an inventory of registered slave HTDs 304 and their respective associated assets. The HTDP 500 may periodically update the inventory of registered slave HTDs 304 as the associated asset is delivered and the respective slave HTD 304 leaves the PAN 108.

As shown in FIG. 5B, in some embodiments a slave HTD 304 may exclude WAN transceiver 210 and a sensor 202. In other embodiments, a slave HTD 304 includes the WAN transceiver 210 and/or the sensor 202. Excluding the WAN transceiver 210 and/or the sensor 202, or alternatively, disabling the WAN transceiver 210 and/or the sensor 202, allows the slave HTD 304 to operate over a longer duration on a charged battery.

Figure 6:
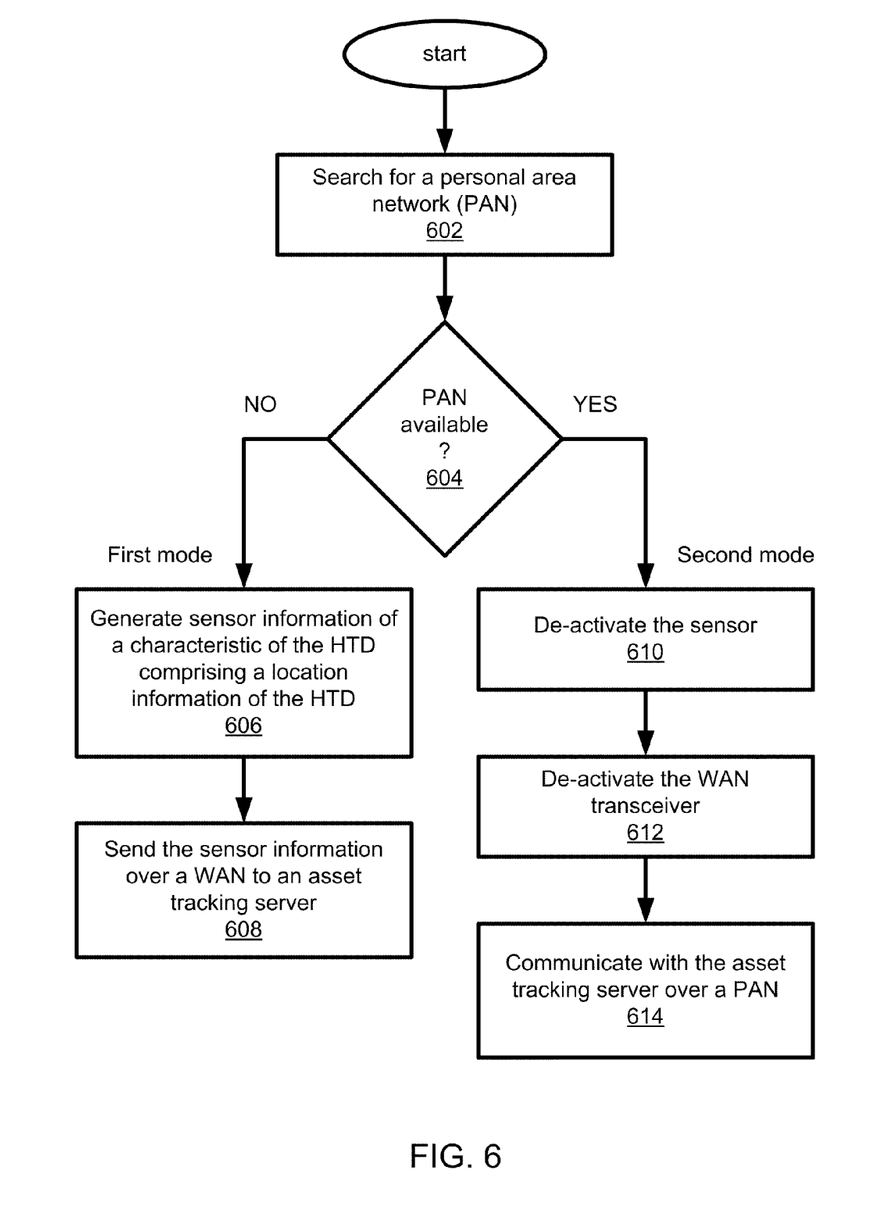
FIG. 6 illustrates a flowchart diagram of a location-based services method, in accordance with some embodiments of the present invention.

FIG. 6 illustrates a flowchart diagram of a location-based services method, in accordance with some embodiments of the present invention. This aspect involves a method of location-based services for tracking an HTD 102 that is associated with an asset. In step 602, an HTD 102 searches for a PAN 108. At step 604, the HTD 102 determines if a PAN 108 is available or not available. If a PAN 108 is not available, processing continues at step 606. If a PAN 108 is available, processing continues at step 610.

At step 606, the HTD 102 enters a first mode of operation (master or gateway thereby acting as a gateway HTD 302) where it communicates over a WAN 110 to an asset tracking server 106. The HTD 102 generates sensor information of a characteristic of the HTD 102. The sensor information includes a location information of the HTD 102 and may also include information from additional sensors. Next, at step 608, the HTD 102 sends sensor information over the WAN 110 to the asset tracking server 106. As slave HTDs 304 attach to the PAN 108, each may send a registration message to the asset tracking server 106 via the PAN 108. The HTD 102 is viewed as a gateway HTD 302 to the slave HTDs 304 and may supplement these registration messages with the sensor information generated earlier.

At step 610, the HTD enters a second mode of operation (thereby acting as a slave HTD 304) where it communicates over the PAN 108 to a gateway HTD 302 or proxy HTDP 500. If the HTD 102 has a sensor 202, it may de-activate it to save battery power. At step 612, the HTD 102 may also de-activate its WAN transceiver 210, if present. At step 614, the HTD may communicate with the asset tracking server 106 via the PAN 108 and gateway HTD 302 or proxy HTDP 500. The HTD 102 may also register its presence in the PAN 108 by sending a registration message over the PAN 108.

Figure 7:
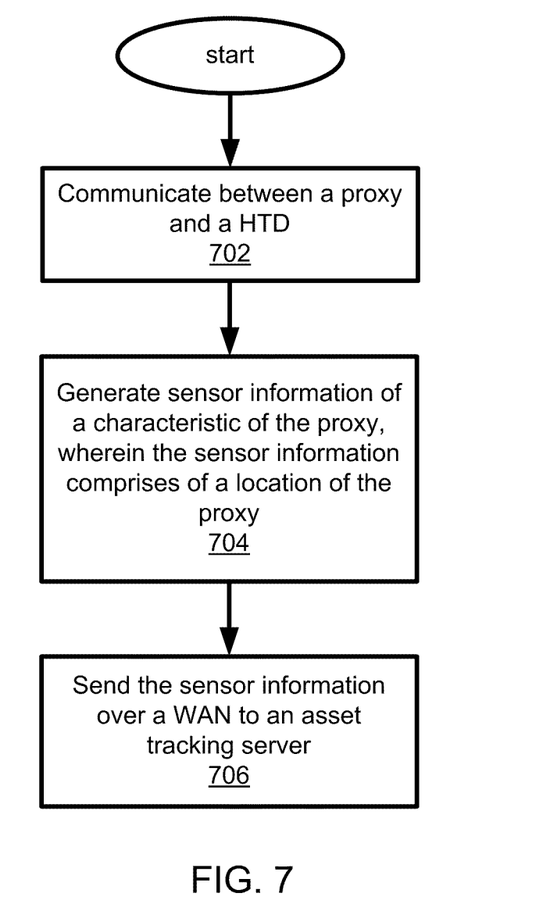
FIG. 7 illustrates another flowchart diagram of a location-based services method, in accordance with some embodiments of the present invention.

FIG. 7 illustrates another flowchart diagram of a location-based services method, in accordance with some embodiments of the present invention. This aspect involves a proxy HTDP 500. At step 702, the HTDP 500 communicates with a slave HTD 304 over a PAN 108. At step 704, the HTDP 500 generates sensor information from its sensor 202. The sensor information is characteristic of the HTDP 500 and includes a location of the HTDP 500. This sensor information may be assigned to each slave HTD 304 that enters the PAN 108 or registers with the HTDP 500. At step 706, the HTDP 500 sends the sensor information over the WAN 110 to the asset tracking server 106. This may be in the form of supplementing communication from a slave HTD 304 on the PAN 108.

Figure 8:
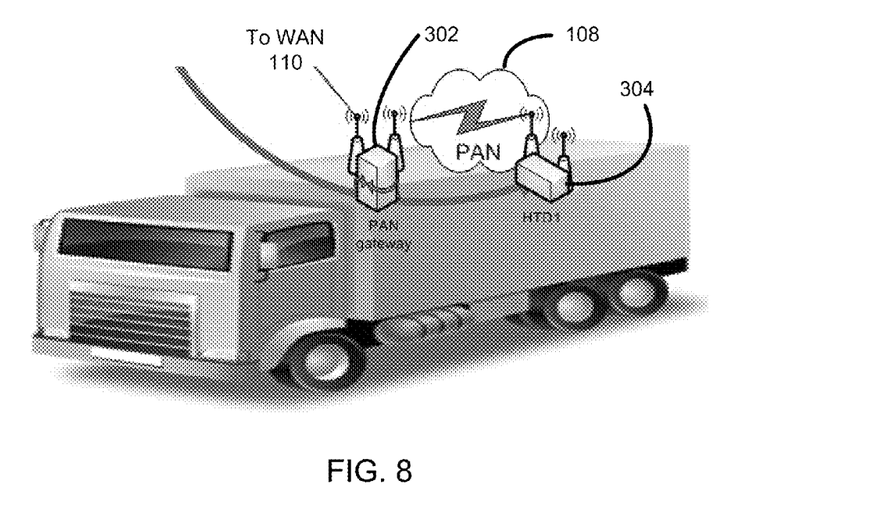
FIGS. 8, 9 and 10 illustrate various implementations of a location-based services system, in accordance with some embodiments of the present invention.
Figure 9:
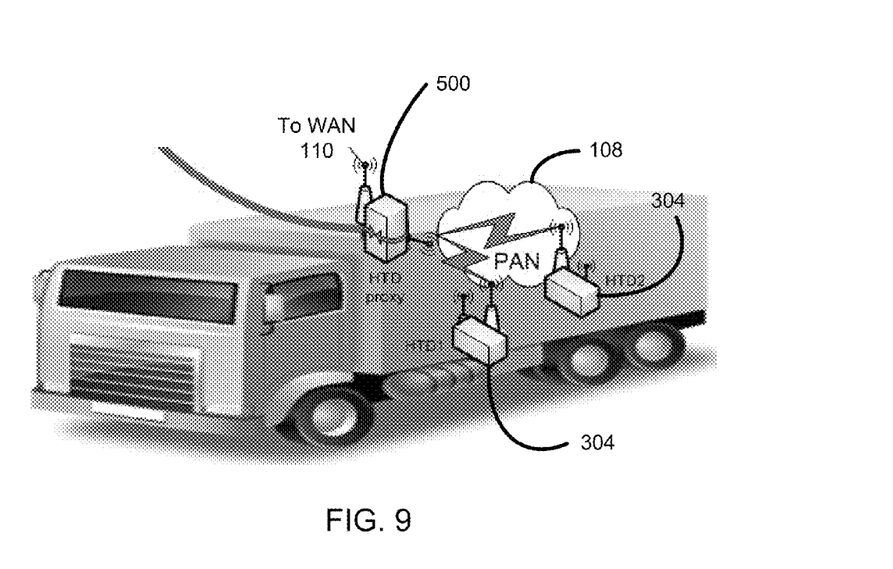
Figure 10:
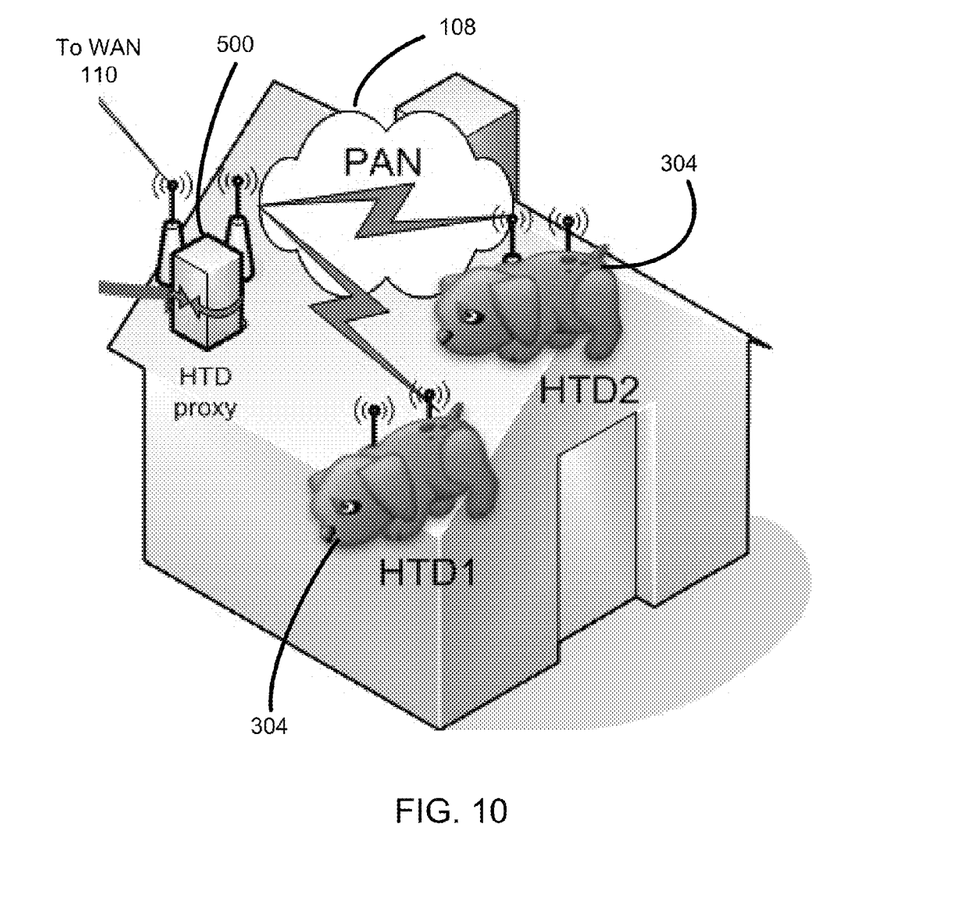

FIGS. 8, 9 and 10 illustrate various implementations of a location-based services system, in accordance with some embodiments of the present invention. In FIG. 8, an HTD 102 is configured as a gateway HTD 302 providing a PAN 108 to a slave HTD 304. The gateway HTD 302 may be associated with an asset or with the truck. Typically, the gateway HTD 302 obtains power from the truck's power system, therefore, power consumption from operating a WAN transceiver 210 and sensor 202 have a minimal impact. The slave HTD 304 may power down or disable its WAN transceiver 210 and/or sensor 202 to save battery power and operate only over the PAN 108. The gateway HTD 302 will assign its location and other sensor information from its sensor 202 to message regarding the slave HTD 304.

In comparison, FIG. 9 illustrates another example of a location-based services for tracking various assets. A proxy HTDP 500 is mounted in the truck and is not associated with an asset apart from the truck. The HTDP 500 obtains power from the truck, communicates with the asset tracking server 106 via a WAN 110, and communicates with slave HTDs 304 via a PAN 108. The two slave HTDs 304 may power down or disable hardware not being used (e.g., sensor 202 and WAN transceiver 210).

FIG. 10 illustrates another example of a location-based services for tracking various assets. In this case, the assets are household pets. The home includes a proxy HTDP 500 connected to the home's power system and provides a link between the slave HTDs 304. The slave HTDs 304 communicate over the PAN 108 to the HTDP 500 and the asset tracking server 106. For example, when a household pet (with a slave HTD 304 around its collar) is within range of the PAN 108, the slave HTD 304 may periodically report its presence to the asset tracking server 106 via the PAN 108. The HTDP 500 supplements this report with sensor data then forwards this report to the asset tracking server 106 over the WAN 110. In this embodiment, a location of the HTDP 500 may be configured as an identification code representative of the home.

For each of the gateways and proxies described above (gateway HTD 302 and proxy HTDP 500), the gateway/proxy may have rules such that when a slave HTD 304 newly enters a PAN 108, the gateway/proxy reports its sensor information (representative of characteristic information of the slave HTD 304) to the asset tracking server 106. Similarly, when a slave HTD 304 is no longer within a PAN 108 (e.g., fails to re-register for more than a predetermined duration), the gateway/proxy may send a reporting message to the asset tracking server 106. For example, when a household pet enters the home, the slave HTD 304 registers with the HTDP 500, which informs the asset tracking server 106 that the pet has entered the home. If the HTDP 500 does not hear from the slave HTD 304 for more than a predetermined about of time, the HTDP 500 may report that the household pet has left the home.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory and executed by the processor. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. For example, the computer-readable media may be encoded with program code to establish a common reference frame based on a detected contact; program code to update a position in a local reference frame based on data from inertial sensors; program code to transform the position in the local reference frame to a position in the common reference frame; and program code to cause the transmission of the position in the common reference frame. Additionally, the computer-readable medium may include program code to determine a spatial relationship between the position in the common reference frame and a received position in the common reference frame or program code to transform a received position in the common reference frame to a received position in the local reference frame and program code to determine a spatial relationship between the position in the local reference frame and the received position in the local reference frame. Additionally, the computer-readable media may include program code to establish a new reference frame based on a different detected contact; program code to generate a transformation from the new reference frame to the common reference frame; and program code to cause the transmission of the transformation.

The computer-readable media may include physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A hybrid tracking device (HTD) associated with an asset to track, the HTD comprising:
    a sensor configured to generate first sensor information related to a characteristic of the HTD, wherein the first sensor information comprises a location of the HTD, additional sensor information, or a combination thereof;
    a personal area network transceiver coupled to a personal area network (PAN) and configured to receive a first presence report message from a second HTD;

a controller to configure the HTD to communicate over the PAN with the second HTD and to communicate over a wide area network (WAN) with an asset tracking server; and a wide area network transceiver coupled to the WAN and configured to transmit the first sensor information over the WAN to the asset tracking server, the WAN transceiver further configured to transmit a reporting message based on a determination that a second presence report message is not received within a threshold time period after receipt of the first presence report message.

2. The device of claim 1, wherein the HTD and the second HTD negotiate via the PAN to determine which of the HTD and the second HTD operates as a gateway HTD based on power resources associated with the HTD and the second HTD, and wherein a determination of which of the HTD and the second HTD operates as the gateway HTD is based on power levels of the power resources associated with the HTD and the second HTD.

3. The device of claim 1, wherein the HTD and the second HTD negotiate via the PAN to determine which of the HTD and the second HTD operates as a gateway HTD based on power resources associated with the HTD and the second HTD, and wherein a determination of which of the HTD and the second HTD operates as the gateway HTD is based on resource types of the power resources associated with the HTD and the second HTD.

4. The device of claim 1, wherein the sensor comprises an assisted global position satellite (A-GPS) sensor.

5. The device of claim 1, wherein the sensor comprises a cell identifier (cell ID) recognition unit configured to execute identification functions and authentication functions.

6. The device of claim 1, wherein the sensor comprises a motion sensor configured to generate motion information, and wherein the additional sensor information comprises the motion information.

7. The device of claim 1, wherein the sensor comprises a temperature sensor configured to generate temperature information, and wherein the additional sensor information comprises the temperature information.

8. The device of claim 1, wherein the sensor comprises a light sensor, a humidity sensor, a pressure sensor, a sound sensor, an air movement sensor, an air sampling sensor, an altimeter sensor, an accelerometer, an orientation sensor, a radiation sensor, or any combination thereof, configured to generate the additional sensor information.

9. The device of claim 1, wherein the WAN transceiver comprises a cellular radio transceiver.

10. The device of claim 1, wherein the PAN transceiver comprises a Bluetooth transceiver.

11. The device of claim 1, wherein the PAN transceiver comprises a ZigBee transceiver.

12. The device of claim 1, wherein the PAN transceiver comprises a radio-frequency identification (RFID) transceiver.

13. The device of claim 1, wherein the PAN transceiver is configured to communicate via the PAN, and wherein the WAN transceiver is configured to communicate via the WAN that is different than the PAN.

14. The device of claim 13, wherein a first communication technology associated with the PAN is a low-power communication technology as compared to a second communication technology associated with the WAN, and wherein the PAN is associated with a first communication range that is shorter than a second communication range associated with the WAN.

15. The device of claim 1, wherein the PAN transceiver is configured to receive second sensor information from the second HTD, and wherein the WAN transceiver is further configured to transmit the first sensor information but not the second sensor information over the WAN to the asset tracking server.

16. The device of claim 1, wherein the first sensor information comprises a measurement of the characteristic of the HTD.

17. The device of claim 1, wherein the controller is further configured to select an operating mode from a first mode and a second mode, wherein the first mode is associated with the HTD as a gateway, wherein the second mode is associated with the HTD as a slave, and wherein the HTD is configured to power down the sensor and the WAN transceiver when operating in the second mode.

18. The device of claim 1, wherein the first sensor information is included in a sensor message transmitted by the WAN transceiver, and wherein the sensor message includes a registration message.

19. The device of claim 1, wherein the second presence report message is not received from the second HTD within the threshold time period after receipt of the first presence report message.

20. A hybrid tracking device (HTD) associated with an asset to track, the HTD comprising:

a wide area network transceiver configured to communicate with an asset tracking server via a wide area network (WAN) and further configured to initiate a time period countdown in response to receipt of a first presence report message and to selectively transmit a reporting message based on an expiration of the time period countdown;

a personal area network transceiver configured to communicate with a second HTD via a personal area network (PAN); and a controller configured to select an operational mode from a gateway mode and a slave mode, wherein the HTD is configured to operate as a gateway device in the gateway mode and is configured to operate as a slave device in the slave mode.

21. A location-based services system, the system comprising:

a first hybrid tracking device (HTD) configured to operate in a master mode; and a second HTD configured to operate in a slave mode, the first HTD associated with an asset to track, wherein the first HTD comprises:

a sensor configured to generate first information related to a characteristic of the first HTD, wherein the first information comprises a location of the first HTD, additional information, or a combination thereof;

a personal area network transceiver configured to receive second information related to a characteristic of the second HTD that includes a first presence report message via a personal area network (PAN);

a controller to configure the first HTD to communicate over the PAN with the second HTD and to communicate over a wide area network (WAN) with an asset tracking server; and a WAN transceiver configured to send a sensor message to the asset tracking server via the WAN, the sensor message including the first information and a reporting message based on a determination that a second presence report message is not received within a threshold time period after receipt of the first presence report message.

22. The system of claim 21, wherein the first HTD is configured to operate as a gateway HTD when the first HTD is coupled to an external power source.

23. The system of claim 21, wherein the first HTD is configured to operate as a gateway HTD when a first battery associated with the first HTD has a higher power level than a second battery associated with the second HTD.

24. A location-based services system, the system comprising:
   an asset tracking server coupled to a wide area network (WAN); and
   a plurality of hybrid tracking devices (HTDs) each associated with a corresponding asset to track, wherein a first HTD of the plurality of HTDs comprises:
      a WAN transceiver configured to communicate with the asset tracking server via the WAN and further configured to initiate a time period countdown in response to receipt of a first presence report message and to selectively transmit a reporting message based on an expiration of the time period countdown;
      a personal area network transceiver configured to communicate with a second HTD of the plurality of HTDs via a personal area network (PAN); and
      a controller configured to select an operational mode from a gateway mode and a slave mode, wherein the first HTD is configured to operate as a gateway device in the gateway mode and is configured to operate as a slave device in the slave mode.

25. The system of claim 24, further comprising a sensor configured to generate first information related to a characteristic of the first HTD, wherein the first information comprises a location of the first HTD, additional information, or a combination thereof, and wherein the sensor comprises a global position satellite (GPS) receiver, an assisted global position satellite (A-GPS) sensor, or an air movement sensor.

26. The system of claim 24, wherein the WAN transceiver is further configured to determine that a second presence report is not received within the time period countdown and to transmit the reporting message after expiration of the time period countdown based on the determination that the second presence report is not received.

27. A proxy in a location-based services system, the proxy comprising:
   a personal area network transceiver coupled to a personal area network (PAN) and configured to receive, over the PAN, a first presence report message from a first hybrid tracking device (HTD) of a plurality of HTDs;
   a controller to configure the proxy to communicate over the PAN with the first HTD and to communicate over a wide area network (WAN) with an asset tracking server; and
   a wide area network (WAN) transceiver configured to transmit a reporting message over the WAN to the asset tracking server in response to a determination that a second presence report message is not received within a threshold time period after receipt of the first presence report message.

28. The proxy of claim 27, wherein the proxy is associated with a structure in which slave HTDs and associated assets are located, and wherein the proxy does not track an asset.

29. A location-based services system, the system comprising:
   an asset tracking server coupled to a wide area network (WAN);
   a plurality of hybrid tracking devices (HTDs) each associated with a corresponding asset to track; and
   a proxy comprising:
      a sensor configured to generate first information related to a characteristic of the proxy, wherein the first information comprises a location of the proxy, additional information, or a combination thereof;
      a personal area network transceiver coupled to a personal area network (PAN) and configured to receive second information related to a characteristic of a first HTD of the plurality of HTDs, the second information including a first presence report message, wherein each HTD of the plurality of HTDs is configured to communicate with the asset tracking server via the proxy;
      a controller to configure the proxy to communicate over the PAN with the first HTD and to communicate over a wide area network (WAN) with the asset tracking server; and
      a WAN transceiver configured to transmit a first message to the asset tracking server over the WAN, the first message including a reporting message based on a determination that a second presence report message is not received within a threshold time period after receipt of the first presence report message.

30. The system of claim 29, wherein the sensor comprises a global position satellite (GPS) receiver, an assisted global position satellite (A-GPS) sensor, or a combination thereof.

31. The system of claim 29, wherein the sensor comprises an altimeter sensor.

32. The system of claim 29, wherein the second presence information includes second sensor information.

33. A method of tracking a hybrid tracking device (HTD) associated with an asset, the method comprising:
   operating the HTD in a first mode associated with a gateway HTD, wherein operating in the first mode comprises:
      configuring the HTD to communicate via a personal area network (PAN) with a second HTD and to communicate via a wide area network (WAN) with an asset tracking server;
      generating, from a sensor, first information related to a characteristic of the HTD, wherein the first information comprises a location of the HTD, additional information, or a combination thereof;
      receiving second information related to a characteristic of the second HTD via the PAN;
      sending a message based on the first information and the second information from a wide area network (WAN) transceiver via the WAN to the asset tracking server;
      initiating a time period countdown in response to receipt of a first presence report message; and
      selectively transmitting a reporting message from a proxy to the asset tracking server based on an expiration of the time period countdown;
   configuring the HTD to transition from the first mode to operate in a second mode associated with a slave, wherein configuring the HTD to operate in the second mode comprises
      powering down the WAN transceiver and the sensor; and
   communicating from the HTD when configured to operate in the second mode via the personal area network (PAN) with one of the gateway HTD or a proxy.

34. The method of claim 33, further comprising communicating from the HTD when configured to operate in the second mode with the asset tracking server via the proxy when the PAN is provided by the proxy.

35. The method of claim 33, wherein the first information comprises a location of the HTD, additional information, or a combination thereof, and wherein the additional information further comprises motion information, information from an orientation sensor, or a combination thereof.

36. The method of claim 33, wherein the first information comprises a location of the HTD, additional information, or a combination thereof, and wherein the additional information further comprises temperature information.

37. The method of claim 33, wherein the WAN transceiver comprises a cellular radio network transceiver, and wherein the PAN comprises a Bluetooth network, a ZigBEE network, or a radio frequency identification (RFID) network.

38. The method of claim 33, wherein the time period countdown corresponds to a threshold time period for receiving a second presence report message.

39. The method of claim 33, further comprising transmitting an identification message to the second HTD for forwarding to the asset tracking server when the HTD is configured to operate in the second mode.

40. The method of claim 33, further comprising receiving an identification of the second HTD when the HTD is configured to operate in the first mode.

41. The method of claim 33, wherein the message is associated with one of the HTD or the second HTD.

42. A method of tracking a hybrid tracking device (HTD) associated with an asset, the method comprising:
configuring a proxy to communicate over a personal area network (PAN) with the HTD and to communicate over a wide area network (WAN) with an asset tracking server;
receiving, at the proxy, first information related to a characteristic of the HTD via the PAN, the first information including a first presence report message;
generating, at a sensor of the proxy, second information related to a characteristic of the proxy, wherein the second information comprises a location of the proxy, additional information, or a combination thereof; and
sending a reporting message from the proxy to the asset tracking server based on a determination that a second presence report message is not received within a threshold time period after receipt of the first presence report message.

43. The method of claim 42, wherein the proxy operates as a gateway HTD.

44. The method of claim 42, further comprising:
receiving third information from a second HTD at the proxy via the PAN, the third information related to a characteristic of the second HTD, the third information generated by a second sensor of the second HTD; and
sending a sensor message via the WAN to the asset tracking server, the second message including the third information.

45. A hybrid tracking device (HTD) associated with an asset to track, the HTD comprising:
a sensor configured to generate information related to a characteristic of the HTD, wherein the information comprises a location of the HTD, additional information, or a combination thereof;
a personal area network (PAN) transceiver configured to receive a first presence report message from a second HTD; and
a wide area network (WAN) transceiver configured to transmit a message to an asset tracking server, wherein the message is based on the first presence report message and includes the sensor information, and wherein the WAN transceiver is further configured to transmit a reporting message to the asset tracking server when a second presence report message is not received within a threshold time period after receipt of the first presence report message.

* * * * *